US011855856B1

(12) United States Patent
Guduru et al.

(10) Patent No.: US 11,855,856 B1
(45) Date of Patent: Dec. 26, 2023

(54) MANAGER FOR EDGE APPLICATION SERVER DISCOVERY FUNCTION

(71) Applicant: Verizon Patent and Licensing Inc., Basking Ridge, NJ (US)

(72) Inventors: Vijayakrishna P. Guduru, Denville, NJ (US); Sudhakar Reddy Patil, Flower Mound, TX (US); Anthony Clay Reynolds, Rhome, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/812,219

(22) Filed: Jul. 13, 2022

(51) Int. Cl.
*H04L 41/40* (2022.01)
*H04L 41/122* (2022.01)
*H04L 43/06* (2022.01)

(52) U.S. Cl.
CPC ............ *H04L 41/40* (2022.05); *H04L 41/122* (2022.05); *H04L 43/06* (2013.01)

(58) Field of Classification Search
CPC ........ H04L 41/40; H04L 41/122; H04L 43/06
See application file for complete search history.

(56) References Cited

U.S. PATENT DOCUMENTS 11,496,553 B1 * 11/2022 Choi .................... H04L 67/131
2021/0314906 A1 * 10/2021 Matolia ............... H04W 64/006
2022/0263788 A1 * 8/2022 Lee ..................... H04L 61/4541
2022/0321475 A1 * 10/2022 Thiebaut ................ H04L 47/11
2022/0321674 A1 * 10/2022 Sung ...................... H04L 67/52

FOREIGN PATENT DOCUMENTS

EP          3955523 A1 *  2/2022  ............ C08G 18/10
WO   WO-2022199867 A1 *  9/2022
WO   WO-2023016280 A1 *  2/2023

OTHER PUBLICATIONS

ETSI, 3GPP TS 29.520 version 15.3.0 Release 15, p. 1-39 (Year: 2019).*
3GPP TS 23.548 V0.3.0, 3rd Generation Partnership Project; Technical Specification Group Services and System Aspects; 5G System Enhancements for Edge Computing; Stage 2, p. 1-49 (Year: 2021).*

* cited by examiner

*Primary Examiner* — Tonia L Dollinger
*Assistant Examiner* — Joseph M Cousins

(57) ABSTRACT

Systems and methods described herein provide an interface for an Network Data Analytics Function (NWDAF) to extract events from an Edge Application Server Discovery Function (EASDF) for a given network slice. An NWDAF in a core network receives an information request for an Edge Application Server (EAS) discovery service. The NWDAF sends, to an EASDF, a data request based on the information request. The NWDAF receives event data from the EASDF that is responsive to the data request and generates an analytics report based on the event data.

20 Claims, 6 Drawing Sheets

MANAGER FOR EDGE APPLICATION SERVER DISCOVERY FUNCTION

BACKGROUND

One enhancement made possible through new broadband cellular networks is the use of Edge networks, also referred to as Multi-access Edge Computing (MEC) platforms. The MEC platforms allow high network computing loads to be transferred onto edge servers. Depending on the location of the edge servers relative to the point of attachment (e.g., a wireless station for a user device), MEC platforms can provide various services and applications to user devices with minimal latency. MEC platforms have limited compute resources which must be managed carefully to maximize availability of the services and applications.

DETAILED DESCRIPTION OF EXAMPLE EMBODIMENTS

Figure 1:
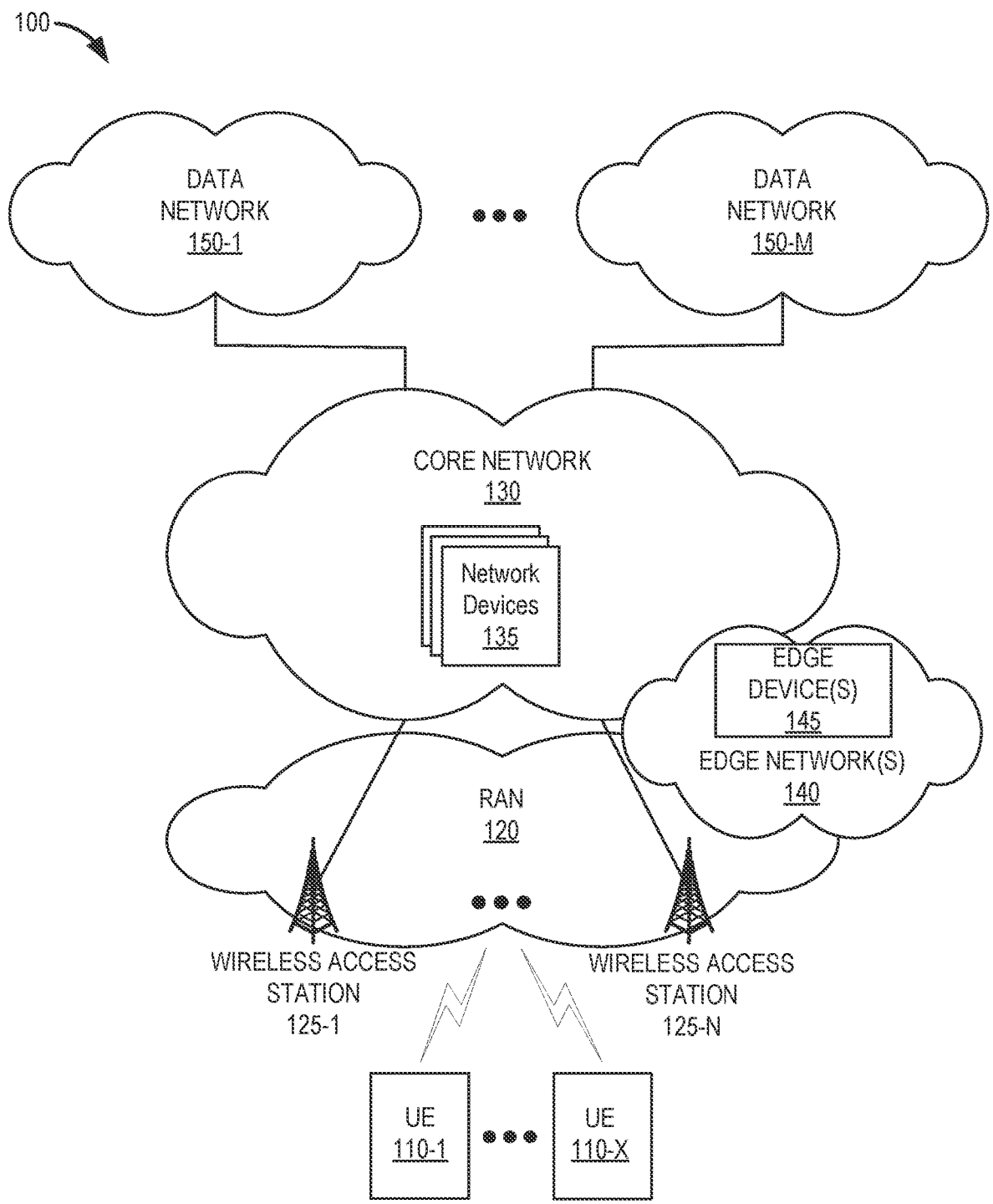
FIG. 1 is a diagram that depicts an exemplary network environment in which systems and methods described herein may be implemented.

The following detailed description refers to the accompanying drawings. The same reference numbers in different drawings may identify the same or similar elements.

Edge networks present new opportunities to provide enhanced services for network customers. In one aspect, edge application servers may be used to provide content and services with minimal latency. For example, an application service may be provided by multiple Edge Application Servers typically deployed in different sites. Multiple edge application servers may host services using a single Internet Protocol (IP) address or different IP addresses. To utilize the optimal (e.g., closest) edge application server, a user equipment (also referred to herein as a "UE device") needs to know the IP address(es) of the appropriate edge application server. The UE device may initiate a discovery process to obtain the IP address(es) of an edge application server (e.g., at the closest location), so that traffic can be routed thereto.

Standardized network functions are being introduced to assist with discovery of edge application servers. For example, an Edge Application Server Discovery Function (EASDF) has been introduced to support a session breakout connectivity model. The EASDF acts as a Domain Name System (DNS) resolver to a UE device and can complement the DNS queries with UE location-related information. The EASDF enables the DNS system to resolve domain names to edge application servers close to the UE device location.

The EASDF is configured by a Session Management Function (SMF) in a wireless core network based on, for example, a Data Network Name (DNN), Single-Network Slice Selection Assistance Information (S-NSSAI), and PDU Session Anchor. The EASDF may handle DNS messages according to instructions from the SMF. Currently there are no standardized interfaces to extract metrics from an EASDF when an EASDF is deployed for network slices to handle low latency edge traffic for applications, such as vehicle-to-everything (V2X) applications; virtual reality, augmented reality, and mixed reality (referred to collectively as "XR") applications; real-time gaming applications; industrial automation applications; etc.

A Network Data Analytics Function (NWDAF) is an operator-managed network analytics logical function defined for 5G systems (5GS). The NWDAF may be responsible for providing network analytics information in response to requests from network functions. For example, NWDAF can provide 5G analytics, closed loop automation, and machine learning. Thus, the NWDAF provides a vendor agnostic solution for end-to-end analytics that consumes metrics and events from 5GC network functions (NFs) and Operations, Administration, and Maintenance (OAM) platforms. Currently, when operators deploy the NWDAF to obtain key performance indicators (KPIs) and other metrics, the NWDAF cannot include event/traffic data from the EASDF. Currently, there is no standardized interface to support EASDF-NWDAF exchanges.

Systems and methods described herein may provide an interface for the NWDAF to extract events from EASDF when operators deploy an EASDF for a given slice type to support low latency functionality for V2X and other latency-sensitive applications on MEC platforms. The NWDAF in a 5G core may have the intelligence to determine when to collect events from the EASDF (e.g., based on network slice selection assistance information (NSSAI) of a low-latency slice supporting V2X, XR, industrial automation, real-time gaming, etc.).

According to an implementation, an interface for an NWDAF is provided to extract events from an EASDF for a given network slice. When a NWDAF in a core network receives an information request for an Edge Application Server (EAS) discovery service, the NWDAF may use the interface to send, to an EASDF, a data request based on the information request. The NWDAF may receive event data from the EASDF and generates an analytics report based on the event data.

FIG. 1 is a diagram of an example environment 100 in which the systems and/or methods, described herein, may be implemented. As shown in FIG. 1, environment 100 may include user equipment (UE) devices 110-1 to 110-X (referred to herein collectively as "UE devices 110" and individually as "UE device 110"), a radio access network (RAN) 120, a core network 130, one or more edge networks 140, and data networks 150-1 to 150-M.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a telematics system in a vehicle; a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player, a WiFi access point, a fixed wireless access (FWA) device, a smart television, etc.; a portable gaming system; global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic delivery, and/or other types of capabilities. In some implementations, UE device 110 may communicate using machine-to-machine (M2M) communication, such as machine-type communication (MTC), and/or another type of M2M communication. In still other implementations, UE device 110 may include a Redcap (Reduced capability) device that is used for applications such as industrial wireless sensors.

RAN 120 may enable UE devices 110 to connect to core network 130 and/or edge network 140 via wireless access station 125 using cellular wireless signals. Each wireless access station 125 may service a set of UE devices 110. For example, wireless access station 125-1 may service some UE devices 110 when the UE devices 110 are located within the geographic area serviced by wireless access station 125-1, while other UE devices 110 may be serviced by another wireless access station 125 when the UE devices 110 are located within the geographic area serviced by the other wireless access station 125.

Wireless access station 125 may include a 5G New Radio (NR) base station (e.g., a gNodeB) and/or a Fourth Generation (4G) Long Term Evolution (LTE) base station (e.g., an eNodeB). According to an implementation, a wireless access station 125 may include a gNB or its equivalent with multiple distributed components, such as a central unit (CU), a distributed unit (DU), a remote unit (RU or a remote radio unit (RRU)), or another type of component to support distributed arrangements. Each wireless access station 125 may include devices and/or components configured to enable cellular wireless communication with UE device 110. For example, wireless access station 125 may include a radio frequency (RF) transceiver configured to communicate with UE devices using a 5G NR air interface, a 4G LTE air interface, and/or using another type of cellular air interface. Wireless access station 125 may enable communication with core network 130 to enable core network 130 to authenticate and monitor network activity of UE device 110. According to one implementation, RAN 120 may include a non-standalone (NSA) network to support dual coverage using 4G and 5G networks. In another implementation, RAN 120 may include a 5G standalone (SA) architecture.

Core network 130 may manage communication sessions for UE devices 110. For example, core network 130 may be implemented to include a next generation core (NGC) network for a 5G network, an Evolved Packet Core (EPC) of an LTE network, an LTE-A network, an LTE-A Pro network, another type of 4G core network, and/or a legacy core network. Core network 130 may provide mobility management, session management, authentication, and packet transport, to support wireless communication services for UE devices 110. Core network 130 may further provide access to data networks 150. For example, core network 130 may establish an Internet Protocol (IP) connection between UE device 110 and a particular data network 150. Core network 130 may include various types of network devices 135, which may implement different network functions described further herein.

Each edge network 140 may be associated with one or more wireless access stations 125 and may provide edge services for UE devices 110 attached to the wireless access station 125. At least a portion of edge network 140 (e.g., a MEC platform) may be in proximity to the wireless access station 125 from a geographic and network topology perspective, thus enabling low latency communication with UE device 110 and/or wireless access station 125. As an example, edge network 140 may be located on a same site as one of the wireless access station 125. As another example, edge network 140 may be geographically closer to the wireless access station 125 and reachable via fewer network hops and/or fewer switches than other wireless access station 125 and/or data networks 150. Edge network 140 may include edge devices 145 that may be configured to provide various services and/or functions. Edge devices 145 may provide MEC services to UE device 110, such as, for example, services from an EAS.

Data networks 150 may each include a data network, such as a packet data network. A particular data network 150 may be associated with an Access Point Name (APN), and UE device 110 may request a connection to the particular data network 150 using the APN. Data network 150 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a 5G system and/or an LTE network), an ad hoc network, a telephone network (e.g., the Public Switched Telephone Network (PSTN) or a cellular network), an intranet, or a combination of networks. In some implementations, one or more network functions of data network 150 may be deployed locally (e.g., in edge network 140).

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
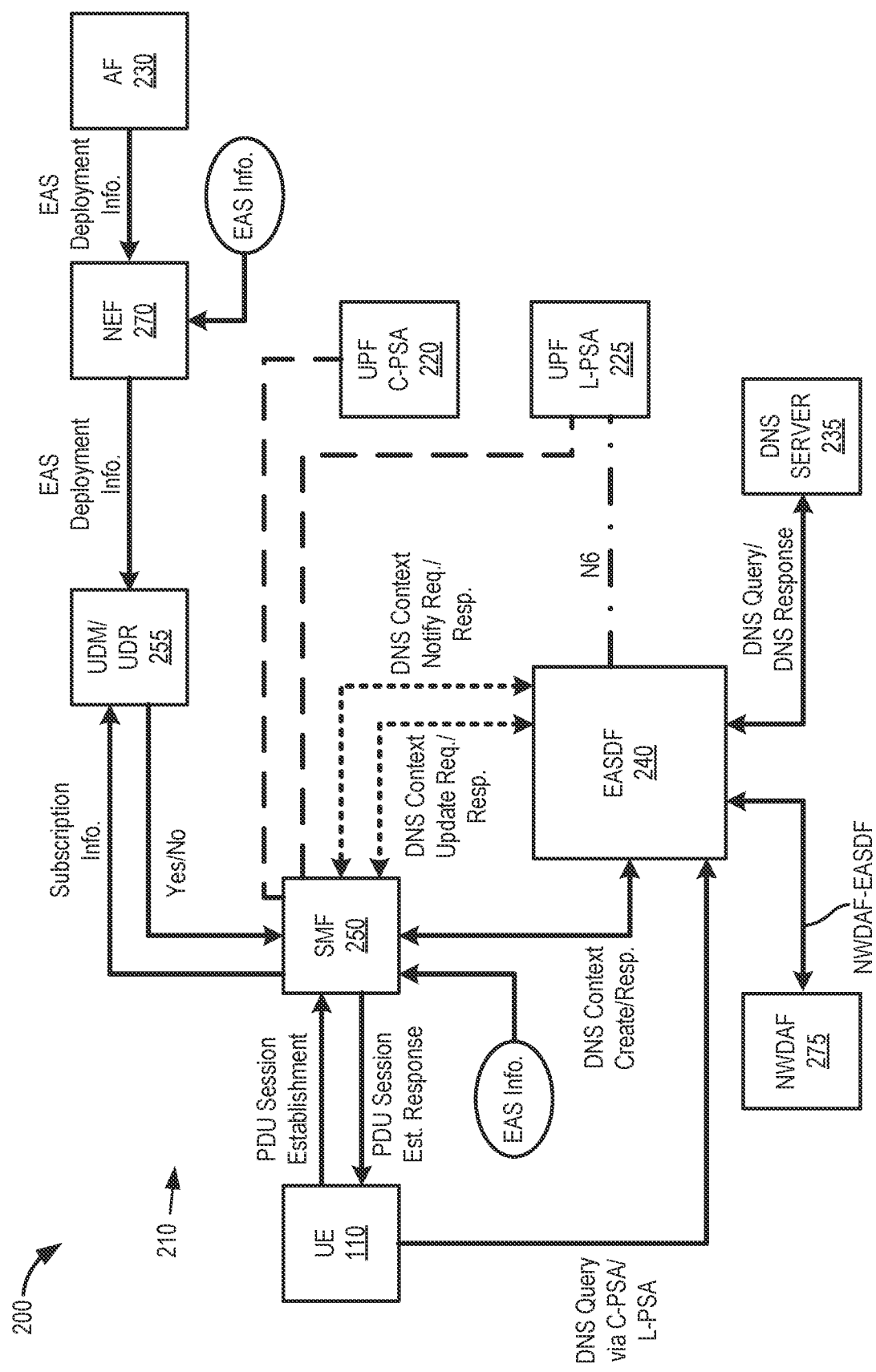
FIG. 2 is a diagram illustrating a network portion in an Edge Application Server Discovery Function (EASDF) architecture, according to an implementation described herein.

FIG. 2 is a diagram illustrating a network portion 200 that includes exemplary components of environment 100 in the context of an EASDF architecture, according to an implementation described herein. In FIG. 2, a 5GS 210 (e.g., including components of RAN 120 and core network 130) may be configured to support data analytics from an EASDF in an edge hosting environment. As shown in FIG. 2, network portion 200 may include a UE device 110, a UPF central PDU Session Anchor (C-PSA) 220, a UPF local PSA (L-PSA), an AF 230, a DNS server 235, an EASDF 240, an SMF 250, a Unified Data Management (UDM) and/or a Unified Data Repository (UDR) (referred to herein as UDM/UDR 255), a Network Exposure Function (NEF) 270, and an NWDAF 275. While FIG. 2 depicts a single instance of the network functions in network portion 200 for illustration purposes, in practice, there may be multiple instances of one or more network functions.

The components depicted in FIG. 2 may be implemented as dedicated hardware components (e.g., network devices 135) or as virtualized functions implemented on top of a common shared physical infrastructure using software defined networking (SDN). For example, an SDN controller may implement one or more of the components of FIG. 2 using an adapter implementing a VNF virtual machine, a containerized network function (CNF) container, an event driven serverless architecture interface, and/or another type of SDN architecture. The common shared physical infrastructure may be implemented using one or more devices 300 described below with reference to FIG. 3 in a cloud computing center associated with core network 130.

According to an implementation, UE device 110 may be configured with an edge DNS client (EDC) that ensures that DNS requests from edge applications are sent to EASDF 240. When UE device 110 performs an FQDN resolution request for an edge application, UE device 110 uses the EDC to perform the domain name resolution. The EDC configures the DNS server address (e.g., EASDF 240) with the DNS server address received front SMF 250 (e.g., in extended Protocol Configuration Options (ePCO).

UPF C-PSA 220 and UPF L-PSA 225 may provide centralized or local UPF functionality to support edge applications. Generally, a UPF may maintain an anchor point for intra/inter-RAT mobility, maintain an external Protocol Data Unit (PDU) point of interconnect to a particular data network 150, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN 120 node (e.g., wireless access station 125), and/or perform other types of user plane processes.

UPF C-PSA 220 may serve as a central site to support a PDU session between UE device 110 and data network 150 (not shown in FIG. 2) and/or between UE device 110 and local network functions of data network 150 executed at edge network 140 (also not shown in FIG. 2). UPF L-PSA 225 may provide a local function (e.g., in edge network 140) to support a PDU session between UE device 110 and DN 150. In some instances, a PDU session has a PSA UPF in a central site (e.g., UPF C-PSA 220) and one or more PSA UPF in a local site (e.g., UPF L-PSA 225). In other instances, a PSA UPF may be assigned for a PDU session as a distributed function (e.g., UPF L-PSA 225). During the session, a different PSA-UPF may replace the prior PSA-UPF, for example, due to UE device 110 mobility.

AF 230 may be associated with an operator that deploys EAS in edge network 140 for a given slice type to support low latency functionality for V2X, XR, and other time-sensitive applications (e.g., edge applications). AF 230 may also request analytics for low latency services, such as analytics based on EASDF 240 data. In instances where AF 230 is outside of core network 130 and/or is not a trusted device, NEF 270 may expose to the 5GS capability to AF 230 to support EAS deployments and requests for analytic services. In instances where AF 230 is a trusted device, AF 230 may bypass NEF 270 to communicate directly with other components of 5GS 210 (e.g., NWDAF 275).

DNS server 235 includes one or more network devices that receive domain names in DNS queries, and resolve (i.e., translate) the domain names into corresponding IP addresses. DNS server 235 may return the resolved IP address to the device/function that originated the DNS query. DNS server 235 may be deployed in different locations in 5GS 210 as a central DNS (C-DNS) server or as a local DNS (L-DNS) resolver/server.

EASDF 240 manages DNS messages according to instruction from the SMF 250. Multiple instances of EASDF 240 may be deployed within 5GS 210, EASDF 240 may influence the resolution of a FQDN so that the EAS discovery process takes into account a location of a PSA when selecting an EAS with the IP address for the DNS query. According to implementations described herein, EASDF 240 may also be configured to provide KPIs and/or metrics to NWDAF 275.

SMF 250 may perform session establishment, session modification, and/or session release, perform IP address allocation and management, perform Dynamic Host Configuration Protocol (DHCP) functions, perform selection and control of UPF C-PSA 220/UPF L-PSA 225, configure traffic steering at UPF C-PSA 220/UPF L-PSA 225 to guide the traffic to the correct destinations, perform lawful intercepts, charge data collection, support charging interfaces, control and coordinate charging data collection, perform downlink data notification, manage roaming functionality, and/or perform other types of control plane processes for managing user plane data. According to implementations described herein, SMF 250 may configure EASDF 240 based on a DNN, S-NSSAI, and a PSA (e.g., UPF C-PSA 220/UPF L-PSA 225).

UDM/UDR 255 may maintain subscription information for UE devices 110, manage subscriptions, generate authentication credentials, handle user identification, perform access authorization based on subscription data, perform NF registration management, maintain service and/or session continuity by maintaining assignment of SMF 250 for ongoing sessions, and/or perform other processes associated with managing user data. According to implementations described herein, UDM/UDR 255 may receive and store EAS deployment information from an AF (e.g., AF 230 via NEF 270). The EAS deployment information may include a particular network slice type (e.g., v2X, eMBB, low latency, etc.) and/or geographic location information for which an EAS may be deployed.

NEF 270 may expose capabilities and events to other NFs, including third party NFs, AFs, edge computing NFs, and/or other types of NFs. Furthermore, NEF 270 may secure provisioning of information from external applications to core network 130, translate information between core network 130 and devices/networks external to core network 130, support a Packet Flow Description (PFD) function, and/or perform other types of network exposure functions, including exposing capabilities of NWDAF 275.

NWDAF 275 may include one or more network devices that may provide functions and/or services specified by a standards entity (e.g., 3GPP, etc.) and/or of a proprietary nature. NWDAF 275 may collect analytics information associated with 5GS 210. For example, NWDAF 275 may collect accessibility KPIs (e.g., a Radio Resource Control (RRC) setup success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), and/or other types of network KPIs. Additionally, NWDAF 275 may include logic that supports collection and distribution of EASDF analytics. As described further herein, NWDAF 275 may use an NWDAF-EASDF interface 280 to request and collect EASD-related KPIs/data from EASDF 240.

In FIG. 2, UE device 110, a UPF C-PSA 220, UPF L-PSA, AF 230, DNS server 235, EASDF 240, SMF 250, UDM) and/or UDM/UDR 255, NEF 270, and NWDAF 275 are illustrated as communicating with one another for EAS discovery and re-discovery. EAS discovery is the procedure by which a UE device discovers an IP address of a local EAS using the Domain Name System. EAS re-discovery is the EAS discovery procedure that takes place when a previously discovered EAS cannot be used or may have become non-optimal (e.g., due to movements of UE device 110). According to implementations described herein, NWDAF 275 may use NWDAF-EASDF interface 280 to request or subscribe to data from EASDF 240. The data may be used to analyze, for example, event data related to EAS supporting UE device mobility by particular types of network slices (e.g., slices supporting V2X). Event data available from EASDF 240 may include DNS traffic and DNS messages, DNS signaling on the user plane over an N6 interface between EASDF 240 and UPF L-PSA 225, EASD Deployment information, and/or metrics/data that indicates abnormal behavior. The communications shown in FIG. 2 provide simplified illustrations of actual communications in network portion 200 and are not intended to reflect every signal or communication exchanged between devices/functions.

Although FIG. 2 shows certain components of network portion 200, in other implementations, network portion 200 may include fewer components, different components, differently-arranged components, or additional components than depicted in FIG. 2. For example, although not illustrated in FIG. 2, core network 130 may include other network functions, such as a Charging Enablement Function (CEF), a Network Repository Function (NRF), a Network Slice Selection Function (NSSF), an Access and Mobility management Function (AMF), etc. Additionally or alternatively, one or more components of network portion 200 may perform functions described as being performed by one or more other components of network portion 200.

Figure 3:
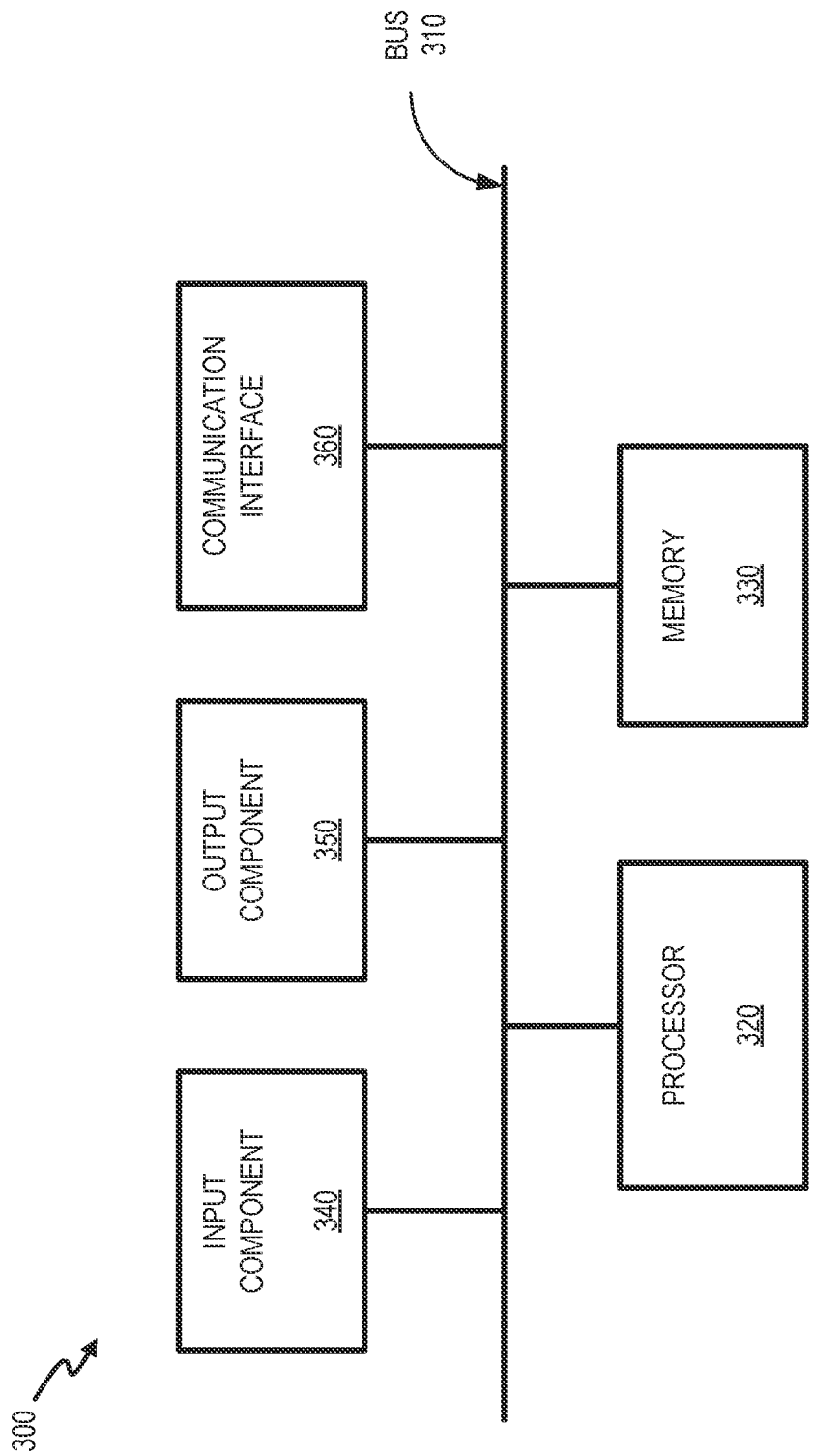
FIG. 3 is a diagram of example components of a device according to an implementation described herein.

FIG. 3 illustrates example components of a device 300 according to an implementation described herein. UE device 110, wireless access station 125, network device 135, UPF C-PSA 220, UPF L-PSA 225, AF 230, EASDF 240, SMF 250, UDM/UDR 255, NEF 270, and NWDAF 275 may each include one or more devices 300. Device 300 may include a bus 310, a processor 320, a memory 330, an input component 340, an output component 350, and a communication interface 360.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320. Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of RF signals. For example, communication interface 360 may include one or more antennas to transmit and/or receive RF signals over the air. In one implementation, for example, communication interface 360 may communicate with a network and/or devices connected to a network. Alternatively, or additionally, communication interface 360 may be a logical component that includes input and output ports, input and output systems, and/or other input and output components that facilitate the transmission of data to other devices.

Device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer components, additional components, different components, or differently arranged components than those depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Figure 4:
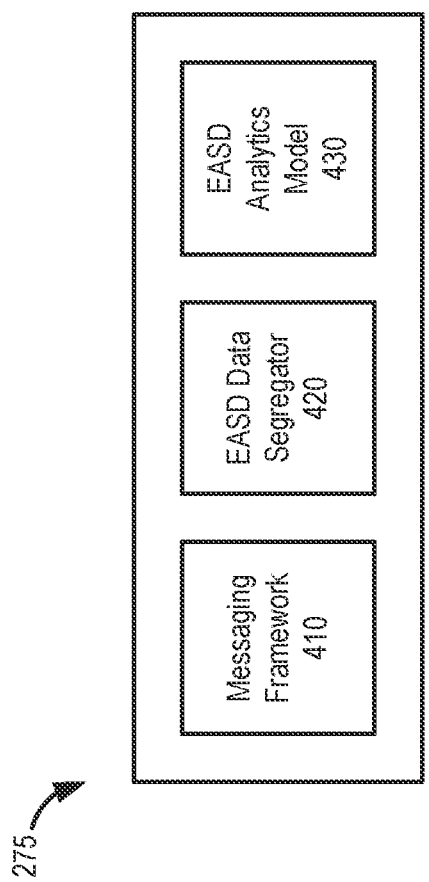
FIG. 4 is a block diagram showing example logical components of a Network Data Analytics Function (NWDAF) for supporting EASDF analytics.

FIG. 4 is a block diagram illustrating some logical components of NWDAF 275 to support analytics using an NWDAF-EASDF interface. NWDAF 275 may generate analytic reports and provide requested reports to different types of network functions (referred to herein as "commissioning NFs" or "NF consumers"). As shown in FIG. 4, NWDAF 275 may include a messaging framework 410, EAS Discovery (EASD) data segregator 420, and a EASD analytics model 430. According to other exemplary embodiments, NWDAF 275 may include additional, different, and/ or fewer components. For example, NWDAF 275 may include a data collection coordination function (DCCF), an analytics data repository function (ADRF), and/or another type of component that may facilitate data collection, analytic, and/or subscription services. The components of FIG. 4 may be implemented, for example, by processor 320 in conjunction with memory 330.

Messaging framework 410 may manage standardized interfaces to allow NF consumers to subscribe to and unsubscribe from different analytic events. For example, NWDAF 275 may receive, via messaging framework 410, an NWDAF analytics request from a NF consumer (e.g., an AF, a Policy Control Function (PCF), a Network Slice Selection Function (NSSF), an AMF, an SMF, a UDM, an Operation, Administration, and Maintenance (OAM) function, or a Charging Enablement Function (CEF)). The analytics request may be part of a subscription-notification model or a request-response model. An analytics request may include, for example, a Nnwdaf_AnalyticsSubscription_Subscribe message or an Nnwdaf_AnalyticsInfo_Request message. The analytics request may further include an analytics identifier that may correspond to EASD analytics (e.g., requiring event data from a EASDF 240). Thus, messaging framework 410 modifies existing NWDAF interfaces with NF consumers to request EASDF-related analytics.

Messaging framework 410 may also use standardized interfaces to notify NF consumers that have a subscription about corresponding observed events. For example, messaging framework 410 may provide an Nnwdaf_Analytics-Subscription_Notify message when an analytics report for a subscription is available. Alternatively, messaging framework 410 may provide a response to an Nnwdaf_AnalyticsInfo_Request message to provide requested analytics. Messaging framework 410 may also use standardized interfaces, such as an Nnwdaf_AnalyticsSubscription_Unsubscribe message, to terminate an active subscription.

To support these analytics requests, messaging framework 410 may use new interfaces (e.g., interface 280) to extract events from EASDF 240 (e.g., when operators deploy an EAS for a given slice type in private and public networks). For example, messaging framework 410 may support data collection from EASDF 240 via standardized event exposure messages (e.g., Nnwdaf_EventExposure_Subscribe, Nnwdaf_EventExposure_Request, etc.). Event exposure messages may request (e.g., from EASDF 240) EASD event data, such as (a) DNS traffic and DNS messages, (b) EASDF user plane activity with the PSA-UPF over an N6 interface for DNS signaling with UE, (c) EASD Deployment information, and/or (d) abnormal behavior information. Messaging framework 410 may also use standardized interfaces to receive responses from an EASDF about corresponding EASD data. For example, messaging framework 410 may receive (e.g., from EASDF 240) an Neasdf_EventExposure_Notify message when requested EASD event data is available.

EASD data segregator 420 may provide intelligence to determine when to collect events from EASDF. For example, EASD data segregator 420 may coordinate with messaging framework 410 to request and/or subscribe to EASD data for a specific network slice (e.g., based on the NSSAI of a low latency V2X slice or another purpose-designated slice). In another implementation, NWDAF 275 may subscribe to EASD data for multiple slices, and EASD data segregator 420 may separate incoming data based on the data source (e.g., EASDF 240), a network slice ID, or another type of EASD indicator for incoming EASD data. EASDF data segregator 420 may direct incoming EASD data to EASD analytics model 430.

EASD analytics model 430 may include machine learning components and analytics models for EASD analytics. EASD analytics model 430 may apply parameters/metrics obtained from EASDF 240 to provide an analytics product or service. As an example, a product or service based on EASD analytics model 430 may identify whether UE devices received an IP address of a suitable EAS deployed in operator specific sites, such as Service Aggregation Point (SAP), Transport Aggregation Point (TAP), and centralized radio access network (C-RAN) sites, for low latency applications. In another example, a product or service based on EASD analytics model 430 may identify DNS server overloading.

Figure 5:
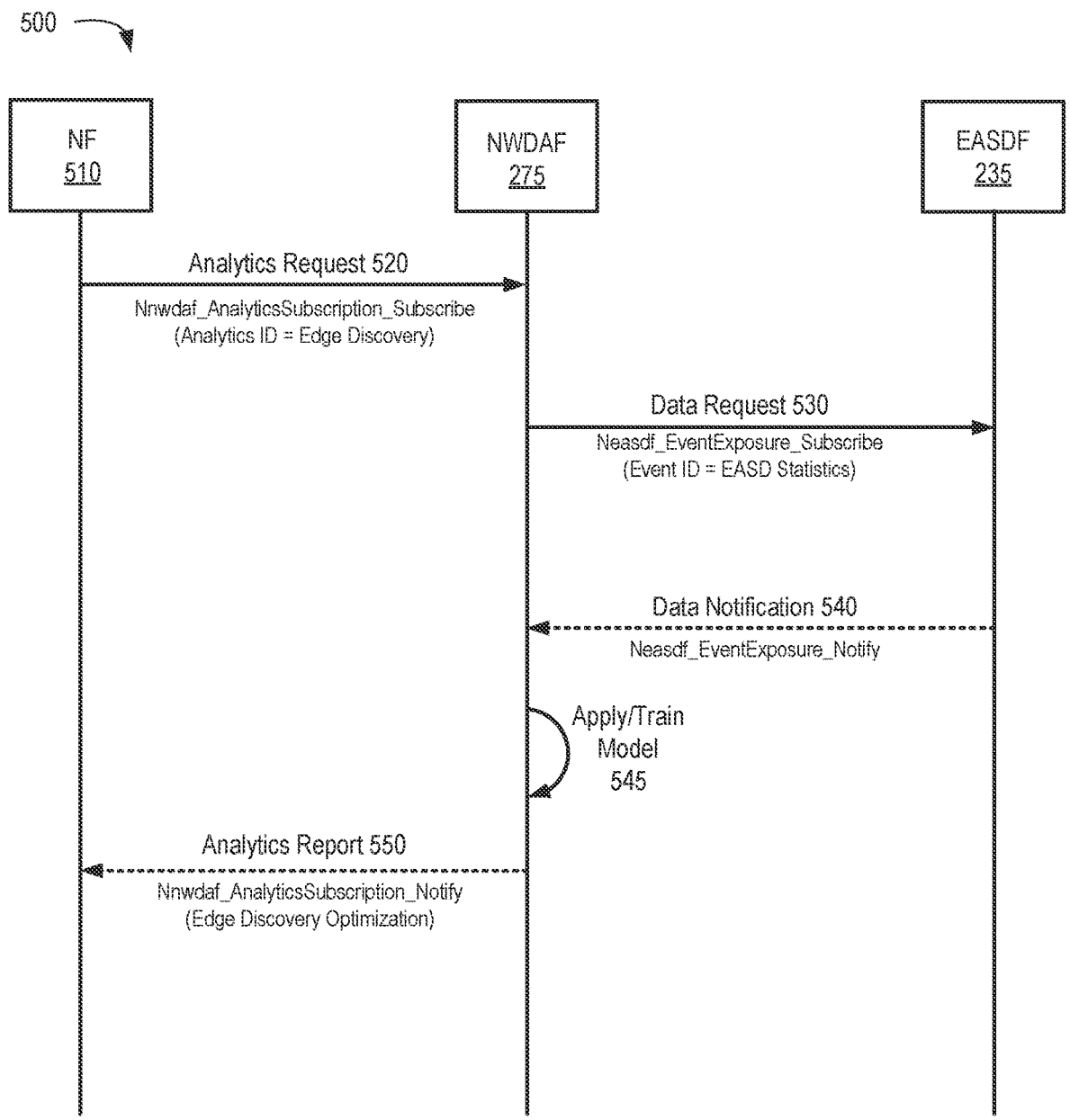
FIG. 5 is a signal flow diagram illustrating communications to provide an analytics report that includes data from an EASDF.

FIG. 5 is a signal flow diagram illustrating communications in a portion 500 of network environment 100 to provide an analytics report that includes data from an EASDF. As shown in FIG. 5, network portion 500 may include EASDF 240, NWDAF 275, and a commissioning network function (NF) 510. NF 510 may correspond to one or more of AF 230 or network devices 135. Communications in FIG. 5 reflect a subscription-based notification model for NWDAF analytics. Communications shown in FIG. 5 provide simplified illustrations of communications in network portion 500 and are not intended to reflect every signal or communication exchanged between devices/functions. For example, in other implementations a request-response model may be used instead of a subscription-notification model.

As shown in FIG. 5, commissioning NF 510 (also referred to as a NF consumer) may subscribe to a EASD analytics service from NWDAF 275. For example, AF 230 may request analytics for DNS signaling and deployment for a low-latency V2X slice. Commissioning NF 510 may send an analytics request 520 (e.g., a Nnwdaf_AnalyticsSubscription_Subscribe message) to NWDAF 275. Analytics request 520 may include an analytics identifier ("Analytics ID") for a particular service that requires data from EASDF 240. The analytics identifier may indicate, for example, "edge discovery" and correspond to DNS traffic and EASD data for an EAS. Analytics request 520 may also include a network slice ID (e.g., e.g., NSSAI value) associated with the EAS.

NWDAF 275 may receive analytics request 520 and, in response, may set up subscriptions to collect network data that supports the analytics service requested by commissioning NF 510. For example, NWDAF 275 may send a data request 530 (e.g., an Neasdf_EventExposure_Subscribe message) to EASDF 240 (e.g., a data provider) via interface 280 to subscribe to receive EASD data from EASDF 240. For example, analytics request 520 may request DNS traffic data and DNS messages, EASDF user plane activity with the PSA-UPF, EASDF deployment information, and/or abnormal behavior information regarding discovery of an EAS by UE devices 110.

In response to data request 530, data provider EASDF 240 may provide network data to NWDAF 275 when certain conditions are met (e.g., when a particular network slice EASD data is generated, etc.). For example, data provider EASDF 240 may send a data notification 540 (e.g., a Neasdf_EventExposure_Notify message) to NWDAF 275 periodically after the requested EASD data is generated. In other implementations, EASDF 240 may send requested data to NWDAF 275 in real time.

NWDAF 275 may receive data notifications 540 and may apply, train, and/or update an analytics model 545 that reflects a result/indicator for the requested analytics service (e.g., as requested, for example, by analytics request 520). For example, NWDAF 275 may train an EASD model relevant to commissioning NF 510 (e.g., associated with a V2X slice and/or application services associated with commissioning NF 510).

NWDAF 275 may provide an analytics report 550, based on the training model (from step 545), to commissioning NF 510. For example, NWDAF 275 may indicate to commissioning NF 510 optimal discovery results for edge resources using an Nnwdaf_AnalyticsSubscription_Notify message for analytics report 550. The Nnwdaf_AnalyticsSubscription_Notify message may indicate, for example, how well discovery parameters used by/for commissioning NF 510 meet latency and/or other requirements for particular network slices. In other implementations, analytics report 550 may include other information responsive to analytics request 520 described above.

Figure 6:
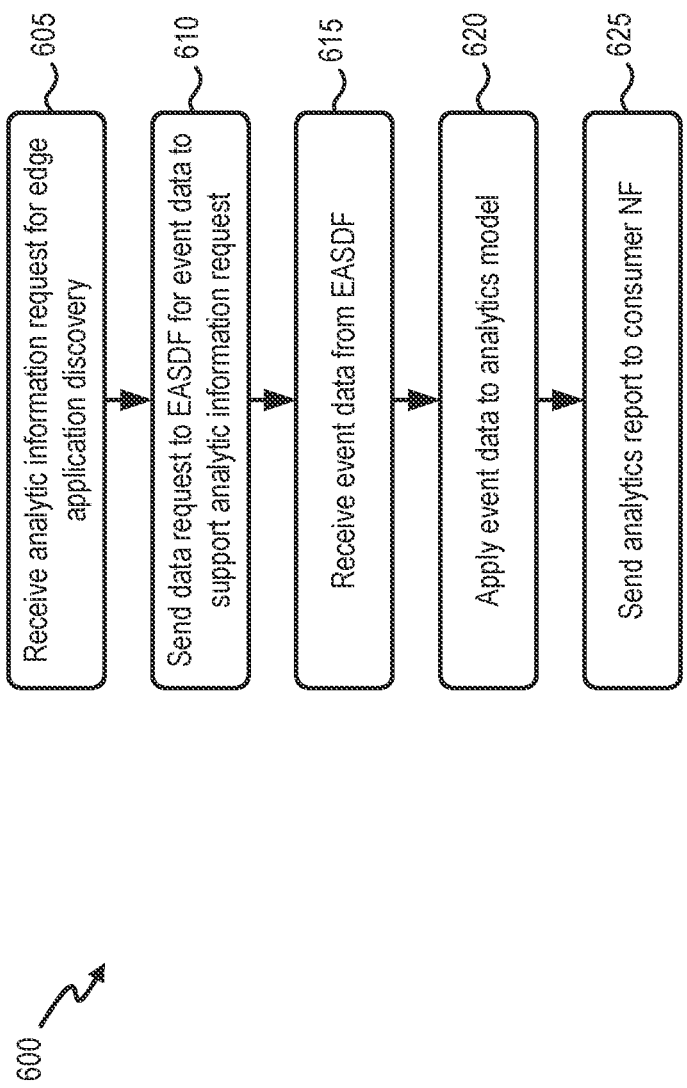
FIG. 6 is a flow diagram illustrating an example process for providing analytic reports for edge application discovery, according to an implementation described herein.

FIG. 6 is a flow diagram illustrating an example process 600 for providing analytic reports for edge application discovery, according to an implementation described herein. In one implementation, process 600 may be implemented by NWDAF 275. In another implementation, process 600 may be implemented by NWDAF 275 in conjunction with one or more other network devices in network environment 100.

Process 600 may include receiving an analytics request for an edge application discovery service (block 605) and sending a data request to an EASDF for event data to support the analytics request (block 610). For example, AF 230 may send an analytics request (e.g., an Nnwdaf_AnalyticsSubscription_Subscribe message or an Nnwdaf_AnalyticsInfo_Request message) to NWDAF 275 to request reports associated with a EASD service. In response, NWDAF 275 may identify KPIs/data needed for the requested report and send to EASDF 240 a data request (e.g., an Neasdf_EventExposure_Subscribe message) via interface 280 to subscribe for the necessary KPIs/data.

Process 600 may also include receiving event data from the EASDF (block 615), applying the event data to an analytics model (block 620), and sending an analytics report to a consumer NF (block 625). For example, in response to the data request from NWDAF 275, EASDF 240 may send a data response (e.g., an Neasdf_EventExposure_Notify message) to NWDAF 275 with the requested KPIs/data. NWDAF 275 may receive the data response and may apply an analytics model that uses the requested KPIs/data to generate an analytics report. NWDAF 275 may forward to the consumer NF (e.g., AF 230) the analytics report for the EASD service.

The foregoing description of implementations provides illustration and description but is not intended to be exhaustive or to limit the invention to the precise form disclosed. Modifications and variations are possible in light of the above teachings or may be acquired from practice of the invention. For example, while a series of blocks have been described with regard to FIG. 6, and message/operation flows with respect to FIG. 5, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a Network Data Analytics Function (NWDAF) in a core network, an information request for an Edge Application Server (EAS) discovery service, wherein the information request includes network slice selection assistance information (NSSAI) for a network slice associated with an EAS;
    sending, by the NWDAF and to an Edge Application Server Discovery Function (EASDF), a data request based on the information request, wherein the sending includes:
        identifying key performance indicators (KPIs) to support the information request, and
        subscribing to receive the KPIs from the EASDF for the network slice associated with the EAS;
    receiving, by the NWDAF, event data from the EASDF that is responsive to the data request; and
    generating, by the NWDAF, an analytics report of optimal discovery results for edge resources based on the event data.

2. The method of claim 1, wherein receiving the information request includes receiving an NWDAF analytics request for one of a request-response model or a subscription-notification model.

3. The method of claim 1, wherein sending the data request includes sending the data request to the EASDF via a standardized interface.

4. The method of claim 1, further comprising:
    sending, by the NWDAF, the analytics report to a commissioning network function via a standardized interface.

5. The method of claim 1, wherein the information request includes NSSAI for a network slice supporting low-latency edge traffic.

6. The method of claim 1, wherein information request includes an analytics identifier for edge discovery.

7. The method of claim 1, wherein the event data includes EAS discovery deployment information, Domain Name System (DNS) traffic data, or DNS messages.

8. The method of claim 1, wherein the event data includes EASDF user plane activity with a Protocol Data Unit (PDU) Session Anchor (PSA) over an N6 interface.

9. A non-transitory computer-readable medium containing instructions, executable by at least one processor, for:
   receiving, by a Network Data Analytics Function (NWDAF) in a core network, an information request for an Edge Application Server (EAS) discovery service, wherein the information request includes network slice selection assistance information (NSSAI) for a network slice associated with an EAS;
   sending, by the NWDAF and to an Edge Application Server Discovery Function (EASDF), a data request based on the information request, wherein the sending includes:
      identifying key performance indicators (KPIs) to support the information request, and
      subscribing to receive the KPIs from the EASDF for the network slice associated with the EAS;
   receiving, by the NWDAF, event data from the EASDF that is responsive to the data request; and
   generating, by the NWDAF, an analytics report of optimal discovery results for edge resources based on the event data.

10. The non-transitory computer-readable medium of claim 9, further comprising instructions for:
   sending, by the NWDAF, the analytics report to a commissioning network function via a standardized interface.

11. The non-transitory computer-readable medium of claim 9, wherein receiving the event data includes receiving the event data from the EASDF in real time.

12. The non-transitory computer-readable medium of claim 9, wherein the event data includes:
   EAS discovery deployment information, and
   user plane activity with a Protocol Data Unit (PDU) Session Anchor (PSA).

13. A network device comprising:
   a processor configured to:
      receive, by a Network Data Analytics Function (NWDAF) in a core network, an information request for an Edge Application Server (EAS) discovery service, wherein the information request includes network slice selection assistance information (NSSAI) for a network slice associated with an EAS;
      send, to an Edge Application Server Discovery Function (EASDF), a data request based on the information request, wherein the sending includes:
         identifying key performance indicators (KPIs) to support the information request, and
         subscribing to receive the KPIs from the EASDF for the network slice associated with the EAS;
      receive event data from the EASDF that is responsive to the data request; and
      generate an analytics report of optimal discovery results for edge resources based on the event data.

14. The network device of claim 13, wherein when receiving the information request, the processor is further configured to receive an NWDAF analytics request using a subscription-notification model.

15. The network device of claim 13, wherein the processor is further configured to:
   send the analytics report to a commissioning network function via a standardized interface.

16. The network device of claim 13, wherein when sending the data request, the processor is further configured to:
   send the data request to the EASDF via a standardized interface.

17. The network device of claim 13, wherein information request includes an analytics identifier for edge discovery.

18. The network device of claim 13, wherein when receiving the event data, the processor is further configured to:
   receive the event data from the EASDF in real time.

19. The network device of claim 13, wherein the event data includes EASDF user plane activity with a Protocol Data Unit (PDU) Session Anchor (PSA).

20. The network device of claim 13, wherein the event data includes Domain Name System (DNS) traffic data or DNS messages.

* * * * *